(12) United States Patent
Mognon

(10) Patent No.: US 8,831,841 B2
(45) Date of Patent: Sep. 9, 2014

(54) AUTOMATIC STEERING DEVICE FOR SELF-PROPELLED STRADDLE CARRIERS FOR LIFTING AND TRANSPORTING MANUFACTURES

(75) Inventor: Bruno Mognon, Bologna (IT)

(73) Assignee: Eden Technology SRL, Galliera Veneta (PD) (IT)

( * ) Notice: Subject to any disclaimer, the term of this patent is extended or adjusted under 35 U.S.C. 154(b) by 608 days.

(21) Appl. No.: 13/127,366

(22) PCT Filed: Oct. 27, 2009

(86) PCT No.: PCT/IB2009/007236
§ 371 (c)(1),
(2), (4) Date: May 3, 2011

(87) PCT Pub. No.: WO2010/061254
PCT Pub. Date: Jun. 3, 2010

(65) Prior Publication Data
US 2011/0224857 A1     Sep. 15, 2011

(30) Foreign Application Priority Data

Nov. 3, 2008   (IT) .............................. CR2008A0023

(51) Int. Cl.
| | |
|---|---|
| B62D 61/10 | (2006.01) |
| B62D 15/00 | (2006.01) |
| B60L 11/00 | (2006.01) |
| B66C 9/04 | (2006.01) |
| B62D 7/04 | (2006.01) |
| B60B 11/02 | (2006.01) |
| B25J 5/00 | (2006.01) |
| B66C 19/00 | (2006.01) |

(52) U.S. Cl.
CPC ... B66C 9/04 (2013.01); B62D 7/04 (2013.01); B60B 11/02 (2013.01); B25J 5/007 (2013.01); B66C 19/007 (2013.01)
USPC ................. 701/50; 701/22; 701/41; 180/411; 180/412; 180/413; 180/24.03; 212/344

(58) Field of Classification Search
CPC .......... B25J 5/007; B66C 19/007; B66C 9/04; B66C 19/005; B66C 13/22; B66C 13/30; B66C 23/00; B62D 61/10; B62D 24/04; B62D 33/00; B62D 39/00; B62D 7/04; B62D 61/02; B62D 61/04; B62D 61/12; B60B 11/02; B60B 11/00; B60B 37/00; B60Y 2200/60; B60Y 2200/66
USPC ........... 701/22, 23, 41, 50; 212/344; 180/411, 180/412, 413, 426, 21, 24.01, 24.03, 24.07
See application file for complete search history.

(56) References Cited

U.S. PATENT DOCUMENTS 1,149,153 A * 8/1915 Schleicher ...................... 180/23
3,584,276 A * 6/1971 Ringland et al. .............. 318/721
(Continued)

FOREIGN PATENT DOCUMENTS

| EP | 1 506 888 A1 | 2/2005 |
| WO | 96/02454 A1 | 2/1996 |

OTHER PUBLICATIONS

International Search Report, dated Mar. 18, 2010, from corresponding PCT application.

*Primary Examiner* — Christine Behncke
(74) *Attorney, Agent, or Firm* — Young & Thompson

(57) ABSTRACT

An automatic steering device for self-propelled straddle carriers for lifting and transporting manufactures, includes a spatial portal structure (1) resting on the ground on a plurality of steering wheel units (4) connected by a fifth wheel (14) to the structure above, where each wheel unit (4) includes two tyred wheels (8, 8') each of which is associated with its own electric motor unit (10, 10') independently with respect to the other; each electric motor is supplied by its own vector frequency converter controlled by a control unit provided with a control microprocessor; angular rotation of each wheel unit (4) is measured by an incremental encoder integral with the upper structure and with the fifth wheel (14) and connected to the microprocessor.

8 Claims, 2 Drawing Sheets

(56) References Cited

U.S. PATENT DOCUMENTS

Figure 4:
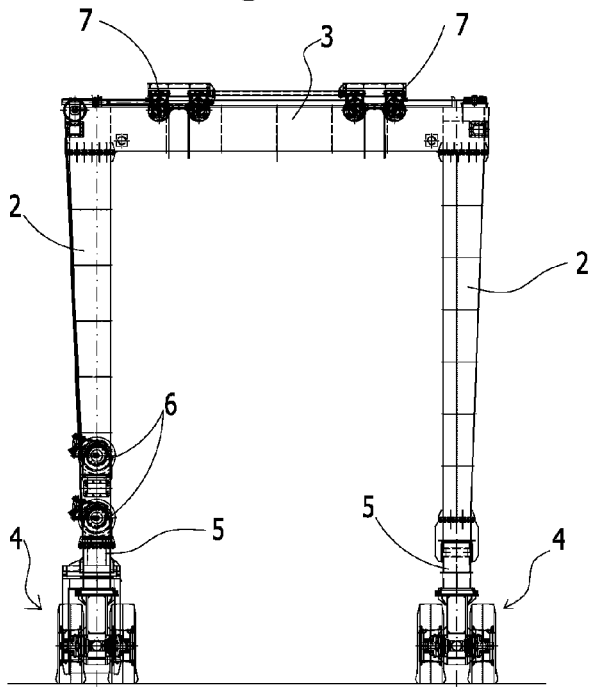

| | | | |
|---|---|---|---|
| 3,792,779 A | 2/1974 | Brazell | |
| 3,827,517 A * | 8/1974 | Williamson | 180/6.48 |
| 4,599,030 A | 7/1986 | Skaalen et al. | |
| 6,293,747 B1 * | 9/2001 | Thomas | 414/460 |
| 7,789,175 B2 * | 9/2010 | Tobey et al. | 180/65.1 |
| 2004/0080223 A1 * | 4/2004 | Shimizu | 310/75 C |
| 2005/0152165 A1 * | 7/2005 | Virolainen et al. | 363/98 |
| 2010/0025349 A1 * | 2/2010 | Khoshnevis | 212/324 |

* cited by examiner

Fig. 1
Fig. 2
Fig. 3
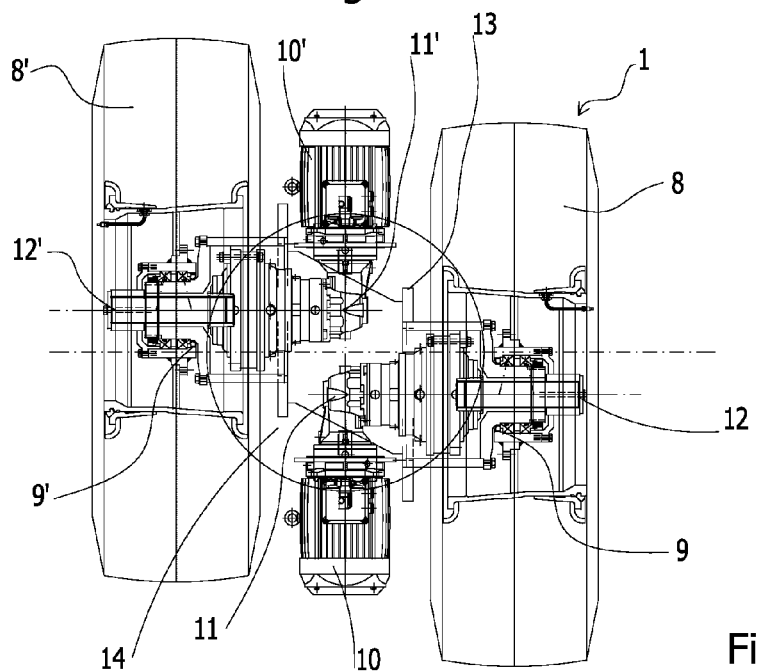
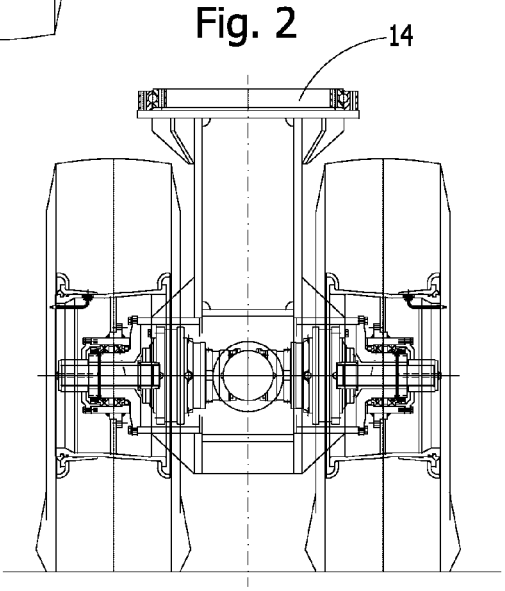
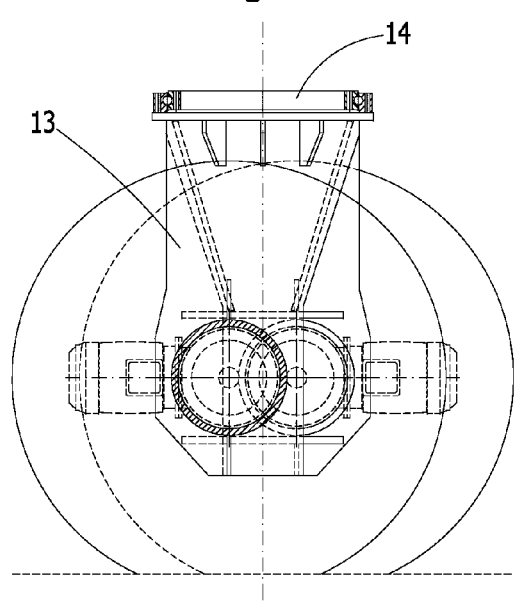

AUTOMATIC STEERING DEVICE FOR SELF-PROPELLED STRADDLE CARRIERS FOR LIFTING AND TRANSPORTING MANUFACTURES

This invention relates to self-propelled straddle carriers for lifting and transporting manufactures; in particular it concerns a device for the automatic steering for those working machines.

In the description, to be clearer, the word "steering" is used to indicate any type of steering that the working machine can carry out to modify or set the trajectory of the trolley for lifting and transporting manufactures.

The traditional straddle carriers for lifting and transporting are essentially made up with a spatial portal structure resting on the ground on four (or more) tyred wheel units connected to each other by means of supporting beams of said portal. All the wheel units, or at least two of them, are connected to the above structure by means of a fifth wheel and they are put into rotation with respect to their vertical axis by an hydraulic cylinder that exerts a tangential force necessary to the rotation; or by an hydraulic motor that generates the same tangential force necessary to the rotation through a pinion acting on a ring gear integral with the fifth wheel.

The self-propelled straddle carriers currently in use need oil-pressure actuators to exert the force necessary to the rotation of the wheel units. The actuators need an hydraulic feeding by means of hoses. The oil must be distributed by suitable hydraulic valves and must be placed under pressure by means of respective oil-pressure pumps. This implies a considerable use of components and huge plant costs.

A further inconvenience that happens over time when two or more cylinders are connected to each other by an hydraulic bar is the oil leak from one cylinder chamber to the another (blow-by). This involves the necessity to foresee the realignment of the system through suitable valves.

Moreover the cylinders and the hydraulic motors require the maintenance of both the seals and the oil-filtration system.

In addition, the steering system through oil-pressure cylinders is limited in the rotating angle that can be obtained in the wheel units owing to the physical features of the system itself; in fact the overall dimensions of the correlated levers and handles cannot exceed determined dimensions without penalizing the dimensions of the self-propelled straddle carrier itself.

The aim of the invention hereby described is to eliminate the above-mentioned inconveniences.

The aim of the invention is to create an automatic steering device that can supply different types of steering to a self-propelled straddle carrier.

A further aim of the invention is to create a machine without hydraulic actuators, levers, pinions and ring gears.

These aims are achieved by means of an automatic steering device for self-propelled straddle carriers for lifting and transporting manufactures, comprising a spatial portal structure resting on the ground on a plurality of steering wheel units connected to said structure above by means of a fifth wheel, characterized in that:
  each wheel unit comprises two tyred wheels each of which is associated to its own electric motor means independently with respect to the other;
  each electric motor is supplied by its own vector frequency converter controlled by a control unit provided with a control microprocessor;
  angular rotation of each wheel unit is measured by means of an incremental encoder integral with said upper structure and with the fifth wheel and connected to said microprocessor.

According to a first aspect of the invention, all the wheels of the steering wheel units are motorized by means of an electric motor and a reduction unit.

According to a preferred aspect of the invention, the torque that generates the wheels rotation is obtained by means of angular transmission reducers in order to allow the positioning of the electric motors between the two wheels.

According to a further preferred aspect, each wheel with its own load is supported by an idle hub, driven by a splined shaft that enters the angular reduction unit.

Preferably, each tyred wheel is offset with respect to its twin so as to limit the transversal overall dimension of the wheel unit.

Preferably, the electric motor is of self-braking type, and it stops automatically in case of lack of power supply.

According to a preferred embodiment, the microprocessor is integrated in a PLC that controls and feeds back in a closed loop the entire kinematic system of the automatic steering device, in order to reach and maintain the curvature radius set by the operator.

The advantages obtained by the automatic steering device according to the invention essentially consist in the possibility for the self-propelled straddle carrier to follow winding plotted courses with any bending radius, to move diagonally with any angle, to rotate roundabout, to move 90°, to steer on one side only leaving the opposite side in a rectilinear position and vice versa.

A further advantage is the extremely reduced operating time of the steering procedure since the rotation of the wheel unit is carried out using the traversing speed of the wheels; therefore linear velocity becomes angular velocity.

Another advantage of the invention is that none of the two wheels of the unit can idle. If this happened, the unit would start rotating but, as a result, also its retroaction would take place, thus stopping the sliding wheel.

Figure 5:
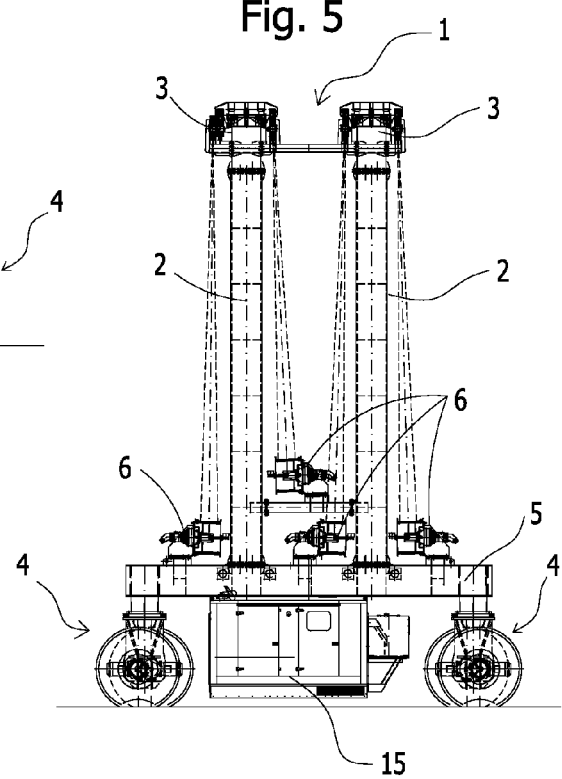
Figure 6:
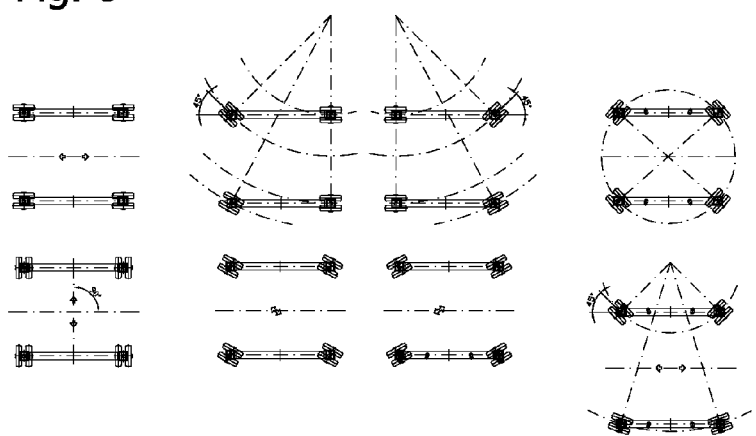

Further features and advantages of the invention will be more evident hereinafter, where a preferable embodiment is described, illustrated by way of non limiting example, with figures where:
  FIG. 1 shows, view from the top, an automatic steering device for lifting and transporting manufactures, according to the invention;
  FIGS. 2, 3 show, respectively from a front and a side view, the device of FIG. 1;
  FIGS. 4, 5 show, respectively from a front and a side view, a self-propelled straddle carrier equipped with the steering device according to the invention;
  FIG. 6 shows a scheme of different possibilities to position the wheel units to obtain different steering procedures of the straddle carrier.

With reference to the details shown in the figures, the self-propelled straddle carrier (working machine) essentially comprises a spatial portal structure 1 consisting of vertical rods 2 and cross rods 3, laying on the ground on wheel units 4 connected to each other by means of beams 5 supporting the spatial portal structure.

The spatial portal structure 1 is equipped with electric motors 6 and tackles 7 for the lifting of the load to be transported according to the known technique.

The wheel units 4 include two twin tyred wheels 8, 8' pivotally supported by an idle hub 9, 9' and each connected to its own electric motor 10, 10' by means of an angular reducer 11, 11' and a splined shaft 12, 12'.

Each electric motor is fed by its own vector frequency convertor and is of the self-braking type, i.e. it stops automatically in case of lack of power supply.

The splined shafts 12, 12' are placed on the same horizontal plane, but they are offset from each other, so as to limit the transversal overall dimension of the wheel unit.

The hubs 9, 9' are combined to a fork 13 connected to the beams 5 by means of a fifth wheel 14 having vertical rotation axis. Between the upper spatial portal structure 1 and the fifth wheel 14 there is an incremental encoder of a known type (not illustrated) arranged for measuring the angular displacement of the wheel unit 4 and transferring the measured signal to a PLC microprocessor for the control of each electric motor 10.

The spatial portal structure 1 also comprises an electric generator 15 suitable for producing energy needed to the running of all the electric motors 10 assembled on the working machine.

In compliance with the present invention, each motor 10, 10' of a wheel unit 4 is connected to its own wheel 8, 8' so as the mutual rotation change induces a rotation of the wheel unit 4 around the fifth wheel axis 14; the encoder measures this rotation and transfers the instantaneous value measured to the PLC. The PLC processes it and controls the vector frequency convertors of the motors 10, 10' according to the type of steering and to the radius chosen by the operator among the programs pre-set during the manufacturing of the working machine and stored in the PLC.

The use of the automatic steering device according to the invention allows the following steering procedures:
steering at still working machine:
steering of the wheel unit 4 by activation of the rotation of the wheels 8, 8' to opposite direction, obtaining a torque that brings to a rotation of the unit itself with respect to its vertical axis (around the fifth wheel 14);
control of the wheel unit 4 angular position by means of incremental encoder integral with the upper structure;
comparison between the value reached by the rotation of the wheel unit 4 and the pre-set value (stored in the PLC memory) corresponding to the type of steering chosen and the set radius;
eventual corrective retroaction for the final equalization of the angular position to the inside tabular value pre-set in the PLC that corresponds to the selected radius of curvature.
steering at working machine in motion:
steering of the wheel unit 4 by accelerating the rotation of one wheel with respect to the other, creating a torque that induces a rotation of the wheel unit itself;
the wheel unit 4 will turn in a clockwise direction if the left wheel is accelerated with respect to the central axis; vice versa it will turn in an anticlockwise direction if the right wheel is accelerated;
control of the angular position of the wheel unit 4 by means of an incremental encoder;
comparison between the value reached by the rotation of the wheel group 4 and the pre-set value (stored in the PLC memory) corresponding to the type of steering chosen and the radius set by the operator;
possible corrective retroaction for the final equalization of the angular position to the inner tabular value pre-set in the PLC;
rotation adjustment of all the wheels of the wheel units 4 of the machine so as to allow the differential effect in the rolling during steering procedure; the wheels that are farther from the instantaneous centre of rotation are more accelerated but always in proportion to the radius of curvature set by the operator.

It being understood the principle of the invention, the embodiments and means of implementation can of course vary or adopt equivalent solutions without exceeding the limits of the protection of the present invention.

The invention claimed is:

1. An automatic steering device for a self-propelled straddle carrier for lifting and transporting manufactures that includes a spatial portal structure (1) resting on the ground on a plurality of steering wheel units (4): wherein
   each of said steering wheel units (4) comprises two tired wheels (8, 8') each of which is associated with its own electric motor means (10, 10') that is independent of other said electric motor means;
   each of said steering wheel units is connected to said structure above by a respective fifth wheel that has a vertical axis and that rotates with a respective one of said steering wheel units about the vertical axis;
   each said electric motor means is supplied by its own vector frequency converter controlled by a control unit provided with a control microprocessor;
   angular rotation of each wheel unit (4) about the vertical axis is measured by an incremental encoder integral with said upper structure and with the fifth wheel (14) and connected to said microprocessor; and
   said control unit tracks a steering angle of each of said steering wheel units and modifies a trajectory of the self-propelled straddle carrier by modifying an order sent to a respective said vector frequency converter by which a respective said electric motor means is operated to modify a rotational speed of a respective one of said tired wheels thereby to turn a respective one of said steering wheel units about the vertical axis.

2. The automatic steering device for self-propelled straddle carriers according to claim 1, wherein each of the tired wheels (8, 8') of the steering wheel units (4) is motorized by means of a reduction unit (11, 11') and a respective one of said electric motor means (10, 10').

3. The automatic steering device for self-propelled straddle carriers according to claim 2, wherein said reduction unit (11, 11') is an angular type.

4. The automatic steering device for self-propelled straddle carriers according to claim 2, wherein each of said wheels (8, 8') is supported by an idle hub (9, 9') driven by a splined shaft (12, 12') that enters the reduction unit (11, 11').

5. The automatic steering device for self-propelled straddle carriers according to claim 2, wherein said electric motor means (10, 10') is a self-braking type, and stops automatically in case of lack of power supply.

6. The automatic steering device for self-propelled straddle carriers according to claim 1, wherein each of the wheels (8, 8') is offset with respect to a directly adjacent one of the wheels.

7. The automatic steering device for self-propelled straddle carriers according to claim 1, wherein the control microprocessor is integrated in a PLC that controls and feeds back in a closed loop of the automatic steering device.

8. A self-propelled working machine that comprises the automatic steering device according to claim 1.

* * * * *